United States Patent
Shin (10) Patent No.: US 9,947,197 B2
(45) Date of Patent: Apr. 17, 2018

(54) ALERTING SYSTEM AND METHOD FOR PORTABLE ELECTRONIC DEVICE

(71) Applicant: Samsung Electronics Co., Ltd., Suwon-si (KR)

(72) Inventor: Jong-hoon Shin, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 15/332,165

(22) Filed: Oct. 24, 2016

(65) Prior Publication Data
US 2017/0124828 A1    May 4, 2017

(30) Foreign Application Priority Data
Nov. 4, 2015 (KR) .................. 10-2015-0154767

(51) Int. Cl.
| | | |
|---|---|---|
| G08B 13/24 | (2006.01) | |
| G08B 25/10 | (2006.01) | |
| H04W 4/00 | (2018.01) | |
| H04W 12/02 | (2009.01) | |
| H04W 12/06 | (2009.01) | |
| H04W 12/12 | (2009.01) | |
| H04W 88/02 | (2009.01) | |

(52) U.S. Cl.
CPC ......... G08B 13/2462 (2013.01); G08B 25/10 (2013.01); H04W 4/008 (2013.01); H04W 12/02 (2013.01); H04W 12/06 (2013.01); H04W 12/12 (2013.01); H04W 88/02 (2013.01)

(58) Field of Classification Search
CPC ..... H04W 12/02; H04W 12/06; H04W 12/12; H04W 4/008; H04W 88/02; H04W 12/00; H04W 48/00; H04W 52/00

USPC .............. 455/410, 411, 414.1, 420, 421, 567
See application file for complete search history.

(56) References Cited

U.S. PATENT DOCUMENTS

| | | |
|---|---|---|
| 6,072,393 A | 6/2000 | Todd |
| 7,187,287 B2 | 3/2007 | Ryal |
| 7,190,257 B2 | 3/2007 | Maltseff et al. |
| 8,335,493 B2 | 12/2012 | Angelhag |
| 8,427,319 B2 | 4/2013 | Vuppala et al. |
| 8,478,482 B2 | 7/2013 | Tan |
| 8,717,172 B2 | 5/2014 | Parker et al. |

(Continued)

FOREIGN PATENT DOCUMENTS

| | | |
|---|---|---|
| CN | 203102506 | 7/2013 |
| KR | 20 50019589 | 2/2015 |
| KR | 101498869 | 3/2015 |

OTHER PUBLICATIONS http://news.naver.nom/main/read.nhn?mode=lpod&mid=tvh&oid=055&aid=0000253656.
https://www.youtube.com/watch?v=htvtdrlle-8.

Primary Examiner — Jean Gelin
(74) Attorney, Agent, or Firm — Onello & Mello, LLP (57) ABSTRACT

An alerting method for portable electronic devices, the alerting method being performed by at least one of first and second portable devices. The method includes first and second electronic devices communicating with one another through two different wireless channels, the first channel providing longer range communications than the second channel. The second electronic device may enter an alarm mode of operation if communications through a channel fails. The second electronic device may exit the alarm mode of operation if communications through the other channel are restored.

19 Claims, 9 Drawing Sheets

(56) References Cited

U.S. PATENT DOCUMENTS

| | | | |
|---|---|---|---|
| 8,880,055 B1 * | 11/2014 | Clement | G06Q 20/3278 |
| | | | 455/410 |
| 2007/0139207 A1 * | 6/2007 | Agapi | G06K 9/00335 |
| | | | 340/573.4 |
| 2008/0122649 A1 | 5/2008 | Liu et al. | |
| 2009/0111378 A1 * | 4/2009 | Sheynman | H04W 8/005 |
| | | | 455/41.1 |
| 2010/0109870 A1 * | 5/2010 | Hsieh | G08B 13/1427 |
| | | | 340/572.4 |
| 2012/0126981 A1 | 5/2012 | Bawamia et al. | |
| 2013/0089028 A1 * | 4/2013 | Lee | H04W 76/02 |
| | | | 370/328 |
| 2013/0212233 A1 * | 8/2013 | Landry | H04M 1/7253 |
| | | | 709/220 |
| 2014/0118145 A1 * | 5/2014 | Wawrzyniak | G08B 21/0247 |
| | | | 340/568.8 |
| 2014/0162701 A1 * | 6/2014 | Jellinek | H04W 4/023 |
| | | | 455/456.6 |
| 2015/0095041 A1 | 4/2015 | Kim | |
| 2015/0142652 A1 | 5/2015 | Miyazawa et al. | |
| 2016/0323927 A1 * | 11/2016 | Yeom | H04W 76/025 |
| 2017/0124362 A1 * | 5/2017 | Sheng | G06K 7/10297 |

\* cited by examiner

ALERTING SYSTEM AND METHOD FOR PORTABLE ELECTRONIC DEVICE

CROSS-REFERENCE TO RELATED APPLICATION

This application claims the benefit of Korean Patent Application No, 10-2015-0154767, filed on Nov. 4, 2015, in the Korean Intellectual Property Office, the disclosure of which is incorporated herein in its entirety by reference.

BACKGROUND

Inventive concepts relate to an alerting system and method, and more particularly, to an alerting system and method for preventing the theft of a portable electronic device.

With the development of semiconductor and battery techniques, high-performance portable electronic devices have appeared. For user's convenience, a portable electronic device may support communication with another portable electronic device or a mobile communication base station through various wireless communication methods. In addition, the portable electronic device may store data, and may particularly store user information that should be secured. When a portable electronic device is lost or stolen, risks such as economic losses and leakage of personal information may occur.

For the case when a portable electronic device is lost or stolen several methods have been proposed for protecting a user's property and personal information by preventing the portable electronic device from being inappropriately used by a person who is not the owner of the portable electronic device. In addition, use of a portable electronic device, particularly, a mobile phone supporting various functions has been popularized, and thus, providing methods for preventing a portable electronic device from being inappropriately used by another person tends to be regulated by law.

SUMMARY

In exemplary embodiments in accordance with principles of inventive concepts a method includes provides an alerting system and method for preventing a portable electronic device from being stolen so that an effective and practical antitheft method is provided.

In exemplary embodiments in accordance with principles of inventive concepts a method includes, there is provided an alerting method for preventing a portable electronic device from being stolen, the alerting method being performed by a second portable electronic device communicating with a first portable electronic device through first and second wireless communication methods different from each other and including determining a distance between the first and second portable electronic devices through the first wireless communication method; the distance is greater than a reference distance issuing an alarm when the distance is greater than a reference distance; attempting to identify the first portable electronic device through the second wireless communication method; and canceling the alarm when the attempting to identify the first portable electronic device succeeds.

In exemplary embodiments in accordance with principles of inventive concepts a method includes, there is provided an alerting method for preventing a portable electronic device from being stolen which uses first and second portable electronic devices communicating with each other through first and second wireless communication methods that are different from each other, the method including determining a distance between the first and second portable electronic devices through the first wireless communication method; issuing an alarm by at least one of the first and second portable electronic devices when the distance is greater than a reference distance; attempting to identify the first and second portable electronic devices by each other through the second wireless communication method; and canceling the alarm when the identification of the first and second portable electronic devices succeeds.

In exemplary embodiments in accordance with principles of inventive concepts, an alerting method for a portable electronic device being performed by a second portable electronic device communicating with a first portable electronic device through first and second wireless communication methods different from each other and includes determining a distance between the first and second portable electronic devices through the first wireless communication method; issuing an alarm when the distance is greater than a reference distance; the second portable electronic device attempting to identify the first portable electronic device through the second wireless communication method; and canceling the alarm when the second portable electronic device identifies the first portable electronic device.

In exemplary embodiments in accordance with principles of inventive concepts a method includes a communicable distance of the second wireless communication method is less than a communicable distance of the first wireless communication method.

In exemplary embodiments in accordance with principles of inventive concepts a method includes the second wireless communication method has a communicable distance of equal to or less than approximately 10 cm.

In exemplary embodiments in accordance with principles of inventive concepts a method includes the attempting to identify the first portable electronic device comprises transmitting and receiving an encrypted signal through the second wireless communication method.

In exemplary embodiments in accordance with principles of inventive concepts a method includes the issuing of the alarm comprises setting a security mode for blocking exposure of data stored in the second portable electronic device.

In exemplary embodiments in accordance with principles of inventive concepts a method includes the setting of the security mode comprises setting the security mode when the alarm is not canceled for a predetermined period of time or longer.

In exemplary embodiments in accordance with principles of inventive concepts a method includes the setting of the security mode comprises setting the security mode when the attempting to identify the first portable electronic device fails a predetermined number of times or more.

In exemplary embodiments in accordance with principles of inventive concepts a method includes the setting of the security mode comprises setting the security mode when power supplied to the second portable electronic device is blocked and is then supplied again.

In exemplary embodiments in accordance with principles of inventive concepts a method includes the second portable electronic device is configured to delete a portion of stored data or locks an external access to stored data during the security mode.

In exemplary embodiments in accordance with principles of inventive concepts a method includes the second portable electronic device is configured to block execution of an operation of processing a portion of stored data during the security mode.

In exemplary embodiments in accordance with principles of inventive concepts a method includes the first wireless communication method is Bluetooth®, and the second wireless communication method is Near Field Communication (NFC).

In exemplary embodiments in accordance with principles of inventive concepts a method includes the first portable electronic device is a wearable electronic device, and the second portable electronic device is a mobile phone.

In exemplary embodiments in accordance with principles of inventive concepts a method includes an alerting method using first and second portable electronic devices communicating with each other through first and second wireless communication methods different from each other and comprising determining a distance between the first and second portable electronic devices through the first wireless communication method; issuing an alarm by at least one of the first and second portable electronic devices when the distance is greater than a reference distance; the first and second portable electronic devices attempting to identify each other through the second wireless communication method; and canceling the alarm when the first and second portable electronic devices identify each other.

In exemplary embodiments in accordance with principles of inventive concepts a method includes a communicable distance of the second wireless communication method is less than a communicable distance of the first wireless communication method.

In exemplary embodiments in accordance with principles of inventive concepts a method includes the first wireless communication method is Bluetooth®, and the second wireless communication method is Near Field Communication (NFC).

In exemplary embodiments in accordance with principles of inventive concepts a method includes a method in a plurality of electronic devices, comprising first and second electronic devices communicating with one another through two different wireless channels, the first channel providing longer range communications than the second channel; the second electronic device entering an alarm mode of operation if communications through the first channel fail; and the second electronic device exiting the alarm mode of operation if communications through the second channel are restored.

In exemplary embodiments in accordance with principles of inventive concepts a method includes the second electronic device identifies the first electronic device through the second channel before exiting the alarm mode of operation.

In exemplary embodiments in accordance with principles of inventive concepts a method includes the first and second electronic devices regularly communicate with one another through the first channel to ensure that any loss of communications through the second channel are detected within a threshold period of time.

In exemplary embodiments in accordance with principles of inventive concepts a method includes the first channel of communications is a near field communications channel.

In exemplary embodiments in accordance with principles of inventive concepts a method includes the second channel of communications is a short distance wireless communications channel.

BRIEF DESCRIPTION OF THE DRAWINGS

Embodiments of the inventive concept will be more clearly understood from the following detailed description taken in conjunction with the accompanying drawings in which.

DETAILED DESCRIPTION OF THE EMBODIMENTS

Inventive concepts will now be described more fully with reference to the accompanying drawings, in which embodiments in accordance with principles of inventive concepts are shown. Inventive concepts may, however, be embodied in many different forms and should not be construed as being limited to the embodiments set forth herein; rather, these embodiments are provided so that this disclosure will be thorough and complete, and will fully convey inventive concepts to those of ordinary skill in the art. Various changes in form and details may be made to inventive concepts and thus should not be construed as being limited to the embodiments set forth herein. Inventive concepts are not limited to the embodiments described in the present description, and thus it should be understood that example embodiments do not include every kind of variation example or alternative equivalent included in the spirit and scope of inventive concepts. In the drawings, like reference numerals denote like elements in various aspects. In the drawings, the width and thicknesses of layers and regions may be exaggerated for clarity of the specification.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. As used herein, the term "and/or" includes any and all combinations of one or more of the associated listed items. Expressions such as "at least one of," when preceding a list of elements, modify the entire list of elements and do not modify the individual elements of the list.

Figure 1:
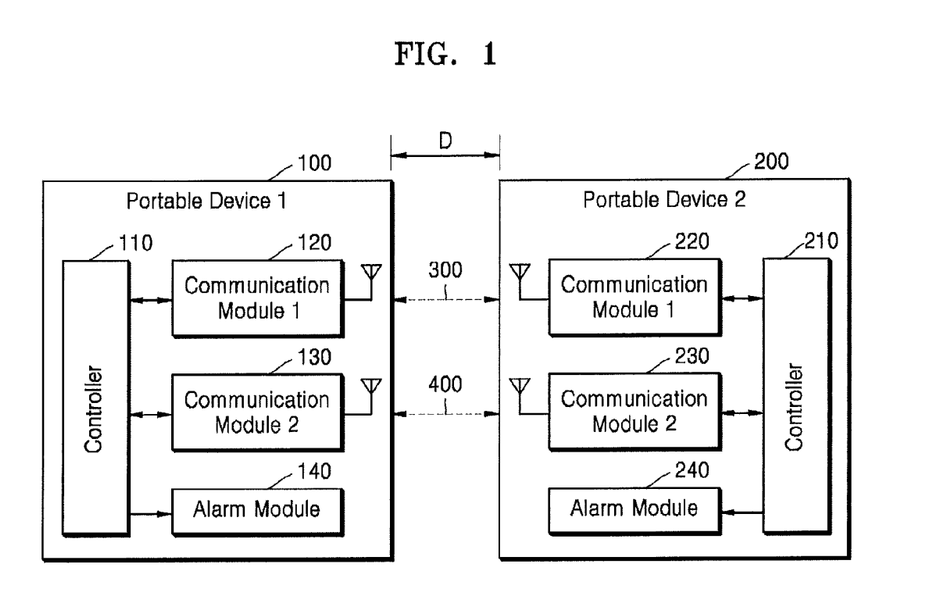
FIG. 1 illustrates block diagrams of portable devices according to an exemplary embodiment in accordance with principles of inventive concepts.

FIG. 1 illustrates block diagrams of exemplary embodiments of portable devices 100 and 200 in accordance with principles of inventive concepts. In this specification, a portable electronic device may also be referred to as a portable device or wireless device.

In exemplary embodiments in accordance with principles of inventive concepts electronic devices, which may be portable electronic devices, may communicate with one another through a plurality of wireless communications channels, or methods. One channel may provide communications over a shorter range than the other. Signal strength on either channel may be employed as a proxy for distance and, in exemplary embodiments, when signal strength through the longer range channel diminishes sufficiently, indicating that the electronic devices are separated by at least a threshold distance, one or both of the electronic devices may enter an alarm mode of operation. In exemplary embodiments, the shorter range wireless communications channel is a Near Field Communications (NFC) channel and the longer range wireless communications channel is a short distance wireless communications channel such as described by the IEEE 802.15.1 standard and commonly implemented as a Bluetooth® channel.

In exemplary embodiments, the devices may regularly attempt to communicate with one another, by "pinging" each other for example, to ensure that the distance between them remains less than or equal to the threshold distance or, if they are separated greater than that distance, to ensure that the separation is immediately detected. In exemplary embodiments the pinging period may be one second, however, inventive concepts are not limited thereto. In the alarm mode of operation one or both of the electronic devices may sound an alarm in the form of an audio (for example, buzzer), visual (for example, an alarm light or verbal message), or mechanical (for example, vibration) alarm. Additionally, secure information in one or both of the devices may be locked when an alarm state exists for at least a threshold period of time, for example.

In exemplary embodiments one electronic device may be more likely to remain with a user and the other device may be more prone to theft or loss. For example, one electronic device may be a wearable device, such as a watch, fitness monitor, or other wearable device and the other may be a smartphone, tablet, or other device that may be readily separated from a user. After entering an alarm mode of operation, the alarm mode may be terminated, or enabled for termination, when the devices are brought together within the distance associated with the shorter range communications channel. After being enabled for termination in this fashion, the devices, particularly the non-wearable device, may be unlocked through an identification protocol that ensures that the two devices have been associated with one another as, for example, belonging to the same user.

The portable devices 100 and 200 may be referred to as portable electronic devices operated by power supplied from a battery. For example, the portable devices 100 and 200 are non-limiting examples, and each of them may be a laptop computer, a tablet PC, a mobile phone, a smart phone, an e-reader, a Personal digital assistant (PDA), an enterprise digital assistant (EDA), a digital still camera, a digital video camera, a portable multimedia player (PMP), a personal navigation device (PND), or a portable navigation device, a handheld game console, or the like. In addition, each of the portable devices 100 and 200 may be an electronic device capable of performing a computing operation in a state of being attached to a user body and may be a wearable device. Each of the portable devices 100 and 200 may be a glove, spectacles, a goggle, a helmet, an armband, a watch, a ring, a necklace, or the like, as non-limiting examples. The two portable devices 100 and 200 illustrated in FIG. 1 may be carried by a single user during operation, for example.

In an exemplary embodiment in accordance with principles of inventive concepts, the two portable devices 100 and 200 may communicate with each other through at least two different wireless communication methods. For example, as illustrated in FIG. 1, the first portable device 100 may include a first communication module 120 supporting a first wireless communication method 300 and a second communication module 130 supporting a second wireless communication method 400. Similarly, the second portable device 200 may include a first communication module 220 supporting the first wireless communication method 300 and a second communication module 230 supporting the second wireless communication method 400.

The first and second wireless communication methods 300 and 400 may refer to communication methods in which information moves through air using radio frequency (RF), light, a magnetic field, an electromagnetic field, sound, or the like, without a medium such as an electrical conductor or an optical cable. For example, the first and second wireless communication methods 300 and 400 may be two different wireless communication methods among wireless communication methods including: Wi-Fi, Bluetooth®, Zigbee®, a wireless USB, near field communication (NFC), and the like, as unlimiting examples. As described later, the first and second wireless communication methods 300 and 400 may have different communication distances or ranges.

The communication modules 120, 130, 220, and 240 included in the first and second portable devices 100 and 200 may be controlled by a controller 110 or 210. For example, in the first portable device 100, the controller 110 may be a processor that is configured to execute commands for performing an alerting method in accordance with principles of inventive concepts, and the processor may execute any command set (for example, Intel Architecture-32 (IA-32), 64 bit extension IA-32, x86-64, PowerPC, Sparc, MIPS, ARM, IA-64 or the like). The controller 110 may control communication with the second portable device 200 by controlling the first and second communication modules 120 and 130.

Alerting modules 140 and 240, also referred to herein as alarm modules 140 and 240, included in the respective first and second portable devices 100 and 200 may be controlled by the controller 110 or 210 respectively, and may issue an alarm by various methods recognizable by a user when the first or second portable device 100 or 200 is lost or stolen. In an exemplary embodiment, the alerting module 140 may include a display device such as a Liquid crystal display (LCD), and may issue an alarm to a user by outputting a symbol or a wording through the display device. In an exemplary embodiment, the alerting module 140 may include a speaker or a buzzer, and may issue an alarm to a user by outputting a sound. In an exemplary embodiment, the alerting module 140 may include a light-emitting element such as a Light emitting diode (LED), and may issue an alarm to a user by emitting light. In an exemplary embodiment, the alerting module 140 may include a motor (or a micromotor), and may issue an alarm to a user by generating vibration.

In an exemplary embodiment in accordance with principles of inventive concepts, the first and second portable devices 100 and 200 may use different wireless communication methods when it is determined whether the first or second portable device 100 or 200 has been lost or stolen and whether the first or second portable device 100 or 200 has been reclaimed. For example, the first and second portable devices 100 and 200 may determine whether the first or second portable device 100 or 200 has been lost or stolen by determining a distance D between the first and second portable devices 100 and 200 through the first wireless communication method 300. In addition, the first and second portable devices 100 and 200 may determine whether the first or second portable device 100 or 200 has been reclaimed when the first and second portable devices 100 and 200 have succeeded in identifying each other through the second wireless communication method 400.

In an alerting method according to an exemplary embodiment in accordance with principles of inventive concepts, when one of two portable devices (for example, the first and second portable devices 100 and 200) that are carried by a user is lost or stolen, an alarm is issued to the portable device still carried by the user to inform the user that the portable device has been lost or stolen, and an alarm is also issued to the lost or stolen portable device to allow a user to easily find the lost or stolen portable device. In addition, the reliability of release (that is, cancellation of an alarm) of the lost or stolen state of the portable device may be increased by using different wireless communication methods, and thus it is possible to practically prevent the portable device from being stolen. The above-described operations of the communication modules 120, 130, 220, and 230 and the alerting modules 140 and 240 may be controlled by the controller 110 or 210, and the alerting method according to an exemplary embodiment in accordance with principles of inventive concepts will be described in greater detail below with reference to FIG. 2.

Figure 2:
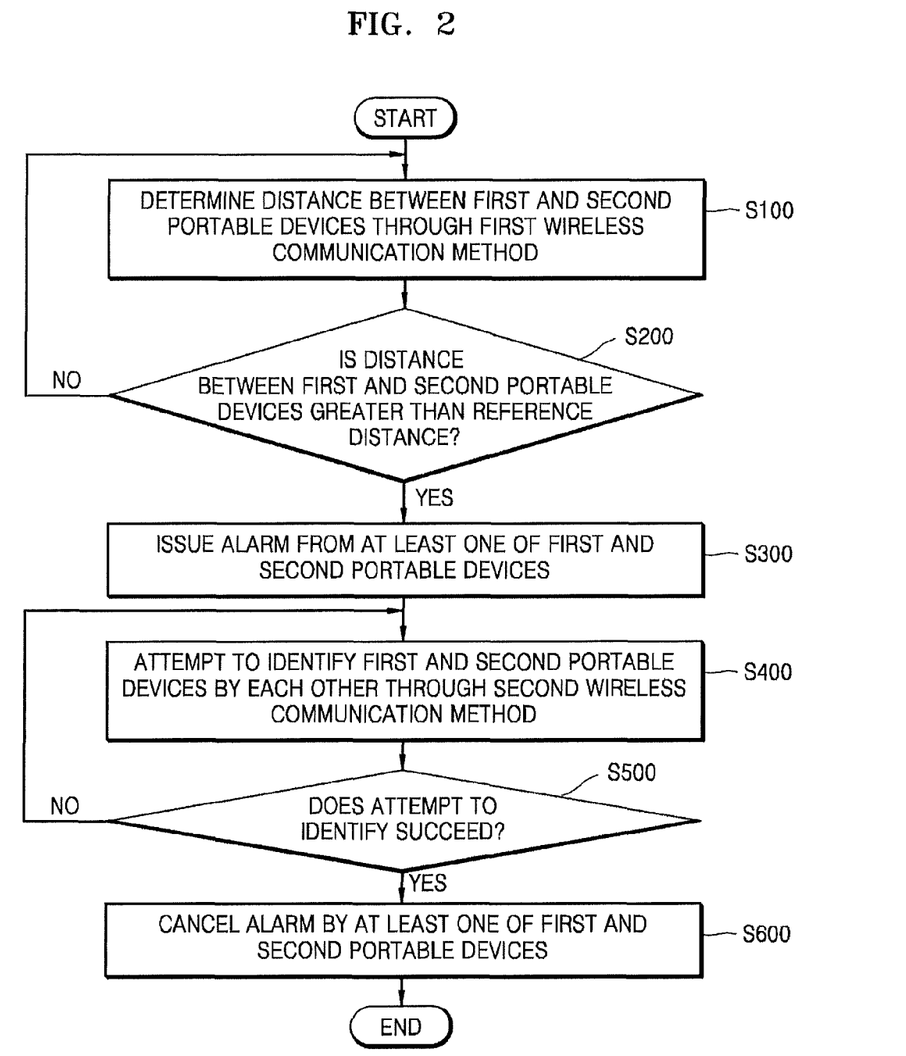
FIG. 2 is a flowchart illustrating an alerting method for the portable device according to an exemplary embodiment in accordance with principles of inventive concepts.

FIG. 2 is a flowchart illustrating an alerting method for a portable device according to an exemplary embodiment in accordance with principles of inventive concepts. As illustrated in FIG. 2, the alerting method according to an exemplary embodiment in accordance with principles of inventive concepts may include steps S100 to S600. The alerting method of FIG. 2 will be illustrated with respect to the first portable device 100 with reference to FIG. 1. However, the alerting method may be applied to the alerting method second portable device 200 in the same or similar manner.

Referring to FIG. 2, in step S100, the distance between the first and second portable devices 100 and 200 may be determined through the first wireless communication method 300. For example, the first communication module 120 of the first portable device 100 may transmit and receive a signal to and from the first communication module 220 of the second portable device 200 through the first wireless communication method 300. As the distance D between the first and second portable devices 100 and 200 increases, the controller 110 may determine the distance D between the first and second portable devices 100 and 200 on the basis of a signal received from the first communication module 120 when the intensity of the signal transmitted and received through the first wireless communication method 300 is decreased or the transmission and reception of the signal become impossible. For example, when the transmission and reception of a signal through the first wireless communication method 300 become impossible, the controller 110 may determine that a distance exceeding a communicable distance of the first wireless communication method 300 that is supported by the first communication module 120 to be the distance D between the first and second portable devices 100 and 200.

In step S200, it may be determined whether the distance D between the first and second portable devices 100 and 200 exceeds a reference distance D_REF. The reference distance D_REF may be a value which is set in advance in order to indicate that the first or second portable device 100 or 200 has been lost or stolen. For example, the reference distance D_REF may be in a range between approximately a few meters and several tens of meters.

When the distance D between the first and second portable devices 100 and 200 exceeds the reference distance D_REF, at least one of the first and second portable devices 100 and 200 may issue an alarm in step S300. For example, the controller 110 of the first portable device 100 and/or the controller 210 of the second portable device 200 may control the alerting module 140 and/or the alerting module 240 so that the alerting module 140 and/or the alerting module 240 issues an alarm.

In step S400, the first and second portable devices 100 and 200 may attempt to identify each other through the second wireless method 400. For example, the second communication module 130 may transmit a signal using the second wireless communication method 400 under the control of the controller 110 of the first portable device 100 in order to communicate with the second communication module 230 of the second portable device 200.

In step S500, it may be determined whether identification between the first and second portable devices 100 and 200 has succeeded. When the first and second portable devices 100 and 200 come close to each other, at a distance equal to or less than a communicable distance of the second wireless communication method 400, the second communication modules 130 and 230 may transmit and receive a signal through the second wireless communication method 400. The first and second portable devices 100 and 200 may identify each other by transmitting and receiving a signal through the second communication modules 130 and 230. When the first portable device 100 communicates with a device other than the second portable device 200, which is lost or stolen, through the second wireless communication method 400, the first portable device 100 may fail in identification. That is, communication with a device other than the second portable device 200 will not be mistakenly interpreted as communication with the second portable device 200.

When the first portable device 100 fails in identification, the first and second portable devices 100 and 200 may attempt to identify each other again through the second wireless communication method 400 (step S400). On the other hand, when the first portable device 100 succeeds in identification, at least one of the first and second portable devices 100 and 200 may cancel an alarm in step S600. For example, the controller 110 of the first portable device 100 and/or the controller 210 of the second portable device 200 may cancel an alarm by controlling the alerting module 140 and/or the alerting module 240.

Figure 3:
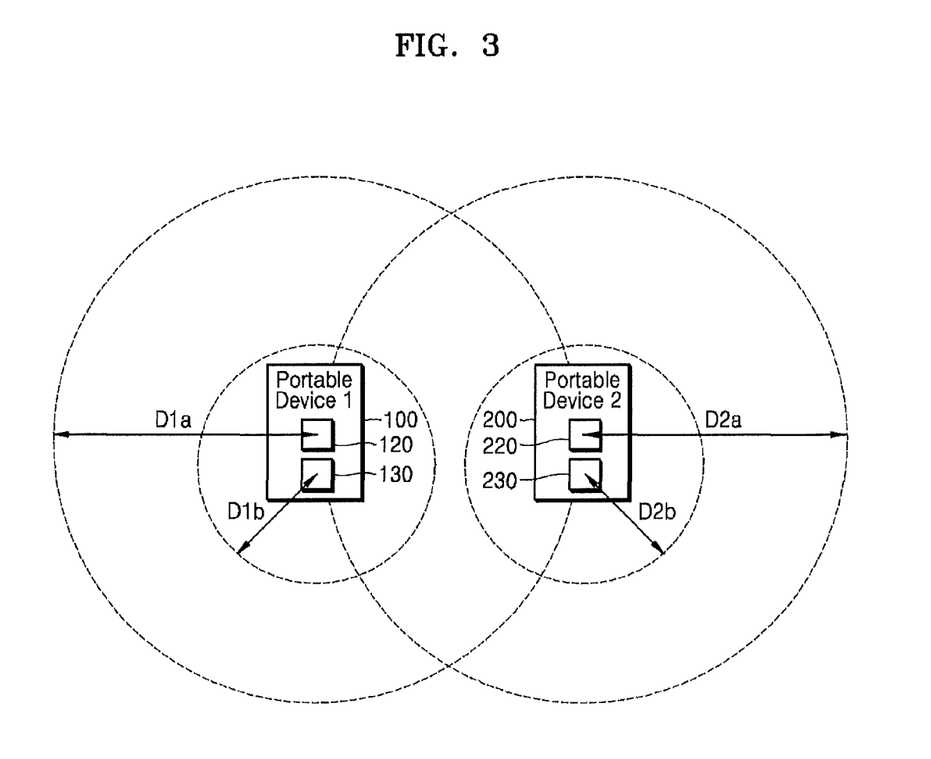
FIG. 3 is a diagram illustrating wireless communication methods supported by the portable devices according to an exemplary embodiment in accordance with principles of inventive concepts.

FIG. 3 is a diagram illustrating wireless communication methods supported by the portable devices according to an exemplary embodiment in accordance with principles of inventive concepts. As described above with reference to FIG. 1, the first and second portable devices 100 and 200 may communicate with each other through the first and second wireless communication methods 300 and 400 that are different from each other.

As described above with reference to FIG. 1, the first and second wireless communication methods 300 and 400 may have different communicable distances. In addition, a distance for allowing the first and second portable devices 100 and 200 to communicate with each other through the first and second wireless communication methods 300 and 400 may be equal to or less than a communicable distance specified by the first and second wireless communication methods 300 and 400. That is, a distance for allowing the first and second portable devices 100 and 200 to communicate with each other through the first and second wireless communication methods 300 and 400 may be determined in accordance with the performance of the communication modules 120, 130, 220, and 230 included in the first and second portable devices 100 and 200.

Referring to FIG. 3, the first communication module 120 and the second communication module 130 of the first portable device 100 may provide communicable distances $D1a$ and $D1b$, respectively. In addition, the first communication module 220 and the second communication module 230 of the second portable device 200 may provide communicable distances $D2a$ and $D2b$, respectively. Accordingly, the first and second portable devices 100 and 200 may communicate with each other through the first wireless communication method 300 when at a distance equal to or less than a smaller distance out of the communicable distances $D1a$ and $D2a$, and may communicate with each other through the second wireless communication method 400 when at a distance equal to or less than a smaller distance out of the communicable distances $D1b$ and $D2b$. In the following description, it is assumed that a smaller value out of the communicable distances $D1a$ and $D1b$ is Da, and a smaller value out of the communicable distances $D2a$ and $D2b$ is Db.

According to an exemplary embodiment in accordance with principles of inventive concepts, the second wireless communication method 400 used to determine whether to cancel an alarm may have a shorter communicable distance than that of the first wireless communication method 300 used to determine whether the first or second electronic device 100 or 200 is lost or stolen. For example, as illustrated in FIG. 3, the communicable distances $D1b$ and $D2b$ provided by the second communication modules 130 and 230 may be less than the communicable distances $D1a$ and $D2a$ provided by the first communication modules 120 and 220, and may be associated with second wireless communication method 400. That is, as illustrated in FIG. 3, when the first and second electronic devices 100 and 200 are spaced apart from each other, the first and second electronic devices 100 and 200 may communicate with each other through the first wireless communication method 300 (which provides communications at distances up to $D1a$ and $D2a$), but may not communicate with each other through the second wireless communication method 400 (which provides communications at distances only up to $D1b$ and $D2b$).

When the second wireless communication method 400 indicates that one device is lost or stolen, the first and second electronic devices 100 and 200 have to come close to each other (at a distance equal to or less than the communicable distance of the second wireless communication method 400) so that the first and second electronic devices 100 and 200 may identify each other in order to cancel an alarm. Accordingly, it is possible to prevent the first and second electronic devices 100 and 200 from being improperly released from their lost or stolen state, because both devices must be within the smaller communication range of one another, presumably in the hands of the rightful user, in order for the release the lost or stolen alarm state. That is, it is possible to prevent a person who is not the owner of the first and second electronic device 100 or 200 from canceling an alarm of the first or second electronic device 100 or 200 if that person has only one of the devices. In particular, when the second wireless communication method 400 requires touches of both the portable devices or a communicable distance equal to or less than approximately 10 cm therebetween, an alarm may be canceled when it is sure that both the first and second portable devices 100 and 200 are under the control of a single, presumably rightful, user.

Figure 4:
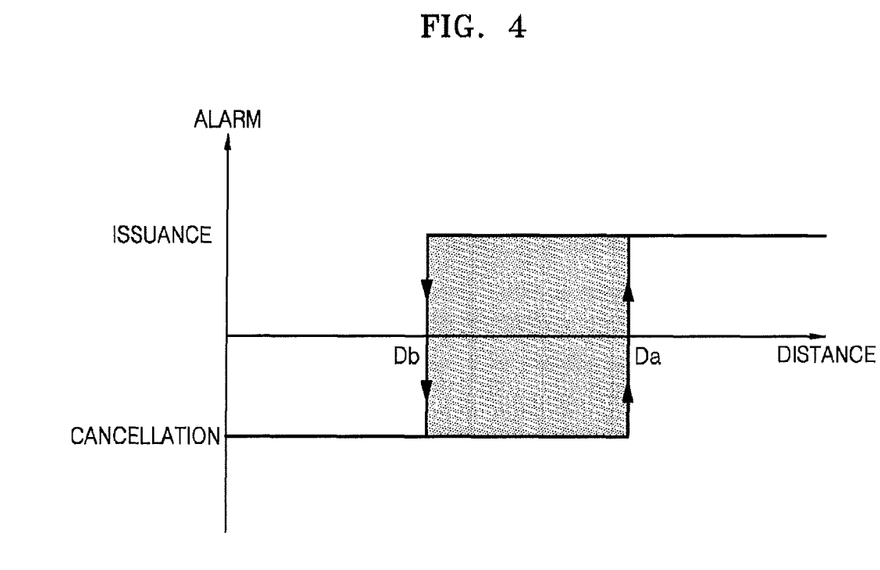
FIG. 4 is a graph illustrating an operating of issuing or canceling an alarm depending on a distance between the portable devices, according to an exemplary embodiment in accordance with principles of inventive concepts.

FIG. 4 is a graph illustrating an operation of issuing or canceling an alarm depending on a distance between portable devices, according to an exemplary embodiment in accordance with principles of inventive concepts. As described above with reference to FIG. 3, in the alerting method according to an exemplary embodiment in accordance with principles of inventive concepts, the first portable device 100 and/or the second portable device 200 may issue and cancel an alarm by using the first and second wireless communication methods 300 and 400 that are different from each other. Hereinafter, in FIG. 4, the first portable device 100 will be described, but it may be understood that such a description may be applied to the second portable device 200 in the same or similar manner.

Referring to FIG. 4, when the distance between the first and second portable devices 100 and 200 is equal to or greater than Da (which is larger than Db), the first portable device 100 may transition from a state where an alarm is canceled (or, simply, not activated), that is, a state where the first and second portable devices 100 and 200 are under the control of a single user, to a state where an alarm is issued, that is, to a state where the first or second portable device 100 or 200 has been lost or stolen. On the other hand, when the distance between the first and second portable devices 100 and 200 is equal to or less than Db (which is smaller than Da), the first portable device 100 may transition from a state where an alarm is issued, that is, a state where the first or second portable device 100 or 200 is lost or stolen to a state where the alarm is canceled, that is, a state where the first and second portable devices 100 and 200 are under the control of a single user, as indicated by the proximity between the two devices. In exemplary embodiments in accordance with principles of inventive concepts, cancellation of the alarm may merely be enabled when portable devices 100 and 200 approach one another within the distance Db, with interaction by the user required to complete the alarm cancellation.

As illustrated in FIG. 4, the first and second portable devices 100 and 200 have hysteresis during the transition between the alarm issuance state and alarm cancellation state of the first and second portable devices 100 and 200, and, thus, it is possible to prevent the first and second portable devices 100 and 200 from being improperly released from the lost or stolen state of the first and second portable devices 100 and 200. Accordingly, the alerting method for a portable device may have high reliability, and communication between the first and second portable devices 100 and 200 through the second wireless communication method 400 may allow reliability to be increased, as described later, for example, with reference to FIG. 8.

Figure 5:
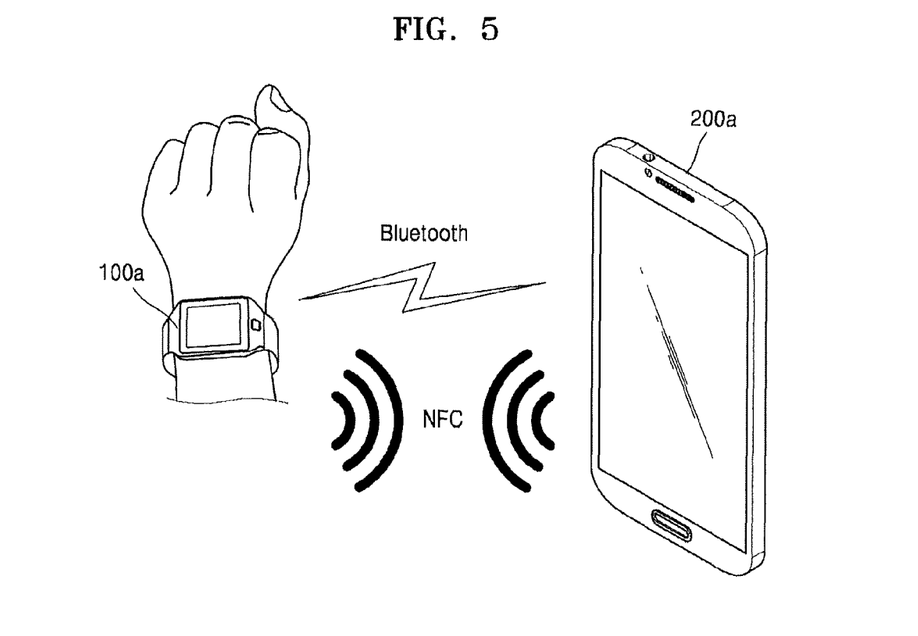
FIG. 5 is a diagram illustrating first and second portable devices of FIG. 1 according to an exemplary embodiment in accordance with principles of inventive concepts.

FIG. 5 is a diagram illustrating the first and second portable devices 100 and 200 of FIG. 1 according to an exemplary embodiment in accordance with principles of inventive concepts. As described above with reference to FIG. 1, each of the first and second portable devices 100 and 200 may be one of a variety of portable electronic devices, and FIG. 5 is only an illustration of the first and second portable devices 100 and 200, and inventive concepts are not limited to the example embodiment of FIG. 5.

Referring to FIG. 5, the first portable device 100 of FIG. 1, which is a wearable device, may be a watch (or a smart watch) 100a, and the second portable device 200 of FIG. 1 may be a mobile phone (or a smart phone) 200a. The watch 100a and the mobile phone 200a may communicate with each other through Bluetooth®, which is the first wireless communication method 300, and may communicate with each other through near field communication (NFC), which is the second wireless communication method 400, in this exemplary embodiment.

The watch 100a, which is a wearable device, may provide various functions. As described above, the watch 100a may support various wireless communication methods (for example, the first and second wireless communication methods 300 and 400) through a communication module, and may acquire information regarding a user's body through a sensor or may display various pieces of information to a user through a display device. In addition, the watch 100a may communicate with the mobile phone 200a to be operated in synchronization with the mobile phone 200a. The watch 100a, which is a wearable device, may be less likely to be lost or stolen, as compared to the mobile phone 200a, for example.

The mobile phone 200a supports various functions, for example, a telephone function, a multimedia reproduction function, a navigation function, an Internet function, a banking function, and a paying function. Accordingly, when an expensive mobile phone 200a is lost or stolen, a serious economic loss may occur. In addition, there may be a risk that a user's personal information stored in the mobile phone 200a may be accessible to criminals when the mobile phone 200a is lost or stolen.

In an alerting method according to an exemplary embodiment in accordance with principles of inventive concepts, when the mobile phone 200a is lost or stolen, a user of the lost or stolen mobile phone 200a may be informed of the loss, thereby enabling the retrieval of the mobile phone 200a, or other loss-prevention actions, by issuance of an alarm by the watch 100a. Given the alarm, a user may more easily find the mobile phone 200a or may remotely lock the phone 200a, for example.

Bluetooth®, which may be employed as the first wireless communication method 300, is one of the wireless communication methods that are generally supported by portable electronic devices, and may have a communicable distance of a few meters to several tens of meters, depending on a Bluetooth® module to be used. In addition, NFC, which may be employed as the second wireless communication method 400, is a wireless communication method that enables the transmission and reception of information when two electronic devices touch each other or come close to each other at a distance equal to or less than approximately 10 cm. NFC may be used for payment, identification and the like, due to a short communicable distance.

As described above with reference to FIGS. 1 to 4, the watch 100a and the mobile phone 200a may determine a distance between the watch 100a and the mobile phone 200a, and the watch 100a and/or the mobile phone 200a may issue an alarm when a distance between the watch 100a and the mobile phone 200a is equal to or greater than a reference distance. When the watch 100a and the mobile phone 200a touch each other, or come close to each other at a distance equal to or less than 10 cm, the watch 100a and the mobile phone 200a may communicate with each other to identify each other and may cancel an alarm when the watch 100a and the mobile phone 200a succeed in the identification.

Figure 6:
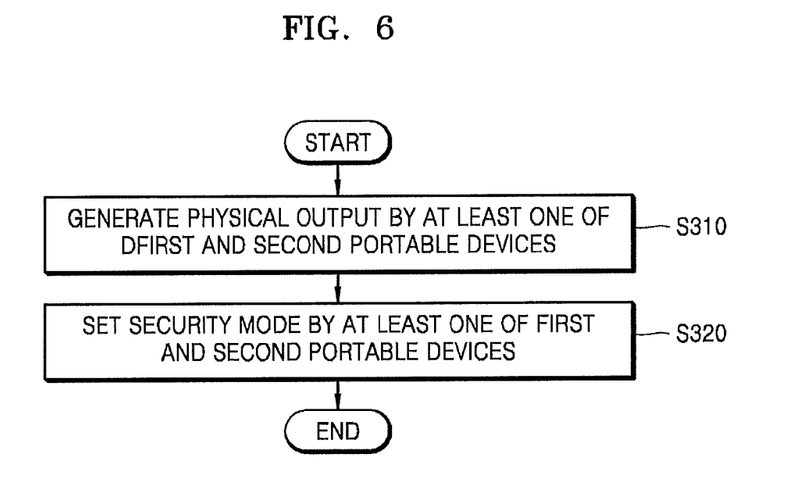
FIG. 6 is a flowchart illustrating an example of step S300 in FIG. 2 according to an exemplary embodiment in accordance with principles of inventive concepts.

FIG. 6 is a flowchart illustrating an example of step S300 in FIG. 2 according to an exemplary embodiment in accordance with principles of inventive concepts. As described above with reference to FIG. 2, in step S300, at least one of the first and second portable devices 100 and 200 may issue an alarm. As illustrated in FIG. 6, step S300 may include steps S310 and S320.

In step S310, at least one of the first and second portable devices 100 and 200 may generate a physical output. The physical output, which is an output that could be sensed by a user, may refer to an output which is sensible by a human through the sense of sight, the sense of hearing, the sense of touch, and the like. For example, as described above with reference to FIG. 1, the alerting module 140 of the first portable device 100 may output a symbol or a wording through a display device, may output a sound through a speaker or a buzzer, may output light through a light-emitting element, or may generate vibration through a motor. In addition, the alerting module 140 may simultaneously perform at least two operations of the plurality of alerting physical outputs, or operations.

In step S320, when a predetermined condition is satisfied, at least one of the first and second portable devices 100 and 200 may set a security mode. The security mode is a mode for blocking the exposure of data stored in the first and second portable devices 100 and 200. When the first and second portable devices 100 and 200 are in a security mode, it is possible to prevent the theft or mishandling of stored data, and the unapproved use of the first and second portable devices 100 and 200 may be restricted. In this manner, in order to protect the portable electronic device from an unapproved external attempt to use the portable electronic device, an operation of changing the state of the portable electronic device may be referred to as activation of a kill switch. For example, one or both of the first and second portable devices 100 and 200 set to be in a security mode may delete a portion of data stored therein or may lock external access to the stored data. That is, all or a portion of data corresponding to personal information such as settlement information and healthcare information may be deleted, or one or both of the first and second portable devices 100 and 200 may be set so that the access of an embedded secure element (eSE) or a processor to a memory area in which data is stored is blocked. In addition, when the first and second portable devices 100 and 200 are set to be in a security mode, the execution of an operation of processing a user's personal information may be blocked. That is, an operation of a program or an application for processing data corresponding to personal information, such as settlement information and healthcare information or the like, for example, updating of settlement information and healthcare information may be stopped, terminated, or the initiation thereof may be prevented.

When a predetermined condition is satisfied, the first portable device 100 and/or the second portable device 200 may be set to be in a security mode, and thus the exposure of data stored therein may be blocked. Hereinafter, examples of step S320 will be described with reference to FIGS. 7A to 7C.

Figure 7A:
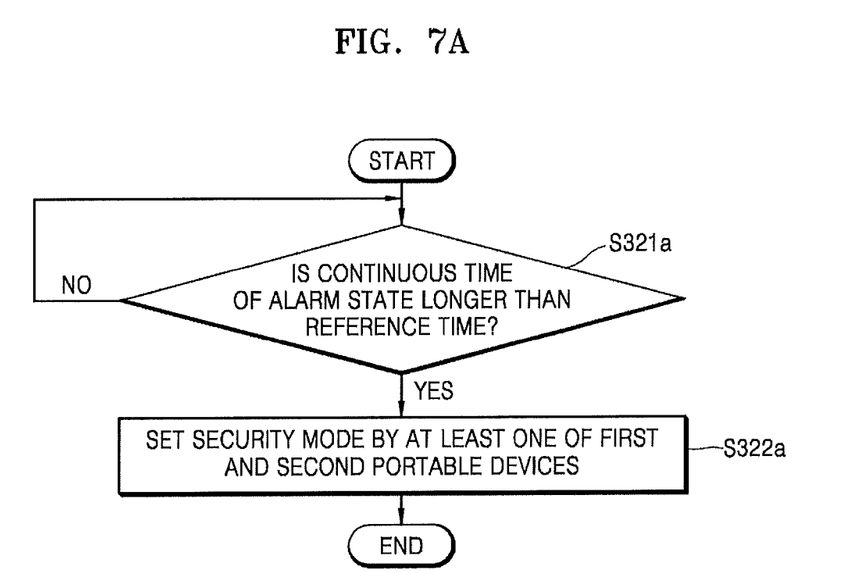
FIGS. 7A to 7C are flowcharts illustrating examples of step S320 in FIG. 6 according to an exemplary embodiment in accordance with principles of inventive concepts.
Figure 7B:
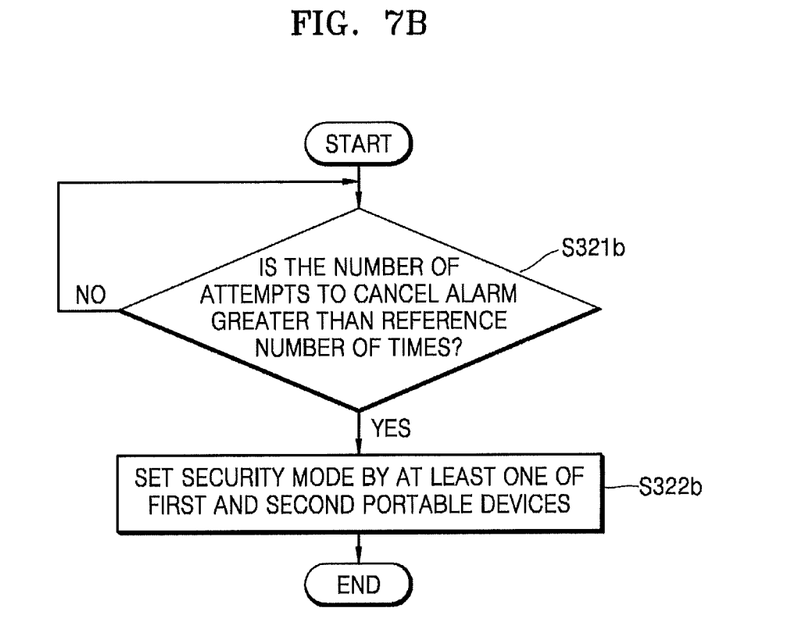
Figure 7C:
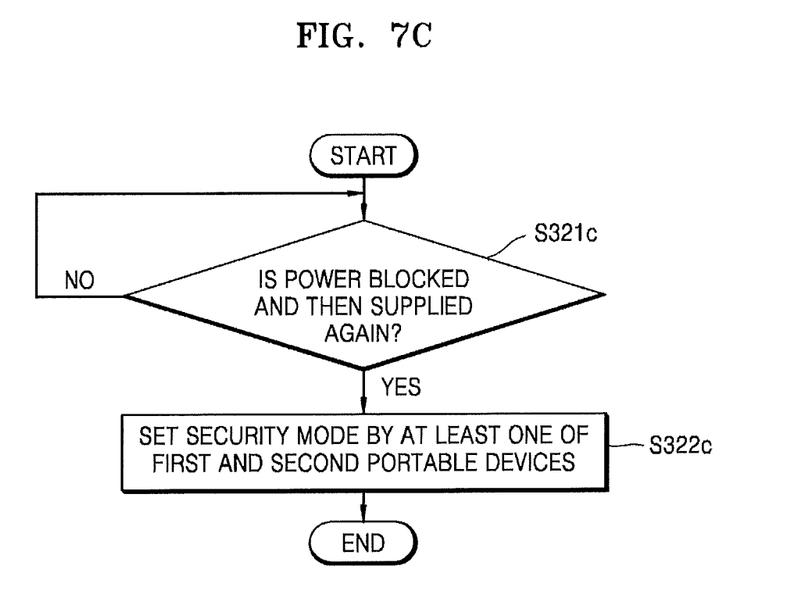

FIGS. 7A to 7C are flowcharts illustrating examples of step S320 in FIG. 6 according to exemplary embodiments in accordance with principles of inventive concepts. As described above with reference to FIG. 6, when a predetermined condition is satisfied, at least one of the first and second portable devices 100 and 200 may be set to a security mode, and FIGS. 7A to 7C illustrate examples of predetermined conditions that may activate such a security mode.

Referring to FIG. 7A, in step S321a, a continuous time of an alarm state (that is, the endurance of an alarm state) and a reference time may be compared with each other. For example, the controller 210 of the second portable device 200 may determine whether a reference time has elapsed from a time when an alarm is issued in response to a distance D between the first and second portable devices 100 and 200 being greater than a reference distance D_REF, According to an exemplary embodiment in accordance with principles of inventive concepts, the reference time may be zero, and thus step S322a may first be performed soon after an alarm is issued.

When the continuous time of an alarm state exceeds a reference time, at least one of the first and second portable devices 100 and 200 may set a security mode in step S322a. For example, when an alarm is not canceled until a reference time (for example, approximately 10 minutes) elapses after the second portable device 200 is lost or stolen, the second portable device 200 may set a security mode.

Referring to FIG. 7B, the number of attempts to cancel an alarm and a reference number of times may be compared with each other in step S321b. As described above, when the first and second portable devices 100 and 200 succeed in identifying each other through the second wireless communication method 400, an alarm may be canceled. Accordingly, when there is an attempt to perform identification using a communication module other than the first and second portable devices 100 and 200 which supports the second wireless communication method 400 as an inappropriate attempt for canceling an alarm, the number of attempts may be counted, and it may be determined whether the number of attempts exceeds a reference number of times. When the number of attempts to cancel an alarm exceeds the reference number of times, at least one of the first and second portable devices 100 and 200 may set, or activate, a security mode in step S322b. For example, when the number of attempts to identify the second portable device 200 using a device other than the first portable device 100 through the second wireless communication method 400 exceeds a reference, or threshold, number of times (for example, three times), the second portable device 200 may activate a security mode.

Referring to FIG. 7C, it may be determined in step S321c whether power is blocked and is then supplied again. For example, a person having stolen the second portable device 200 may block power supplied to the second portable device 200 by removing a battery, in order to cancel an alarm. Accordingly, in order to prevent the inappropriate use of the second portable device 200 at a location distant from a user, it may be determined whether power is supplied to the second portable device 200 again, after having been blocked. When power is blocked and is then supplied again, at least one of the first and second portable devices 100 and 200 may activate a security mode in step S322c.

Figure 8:
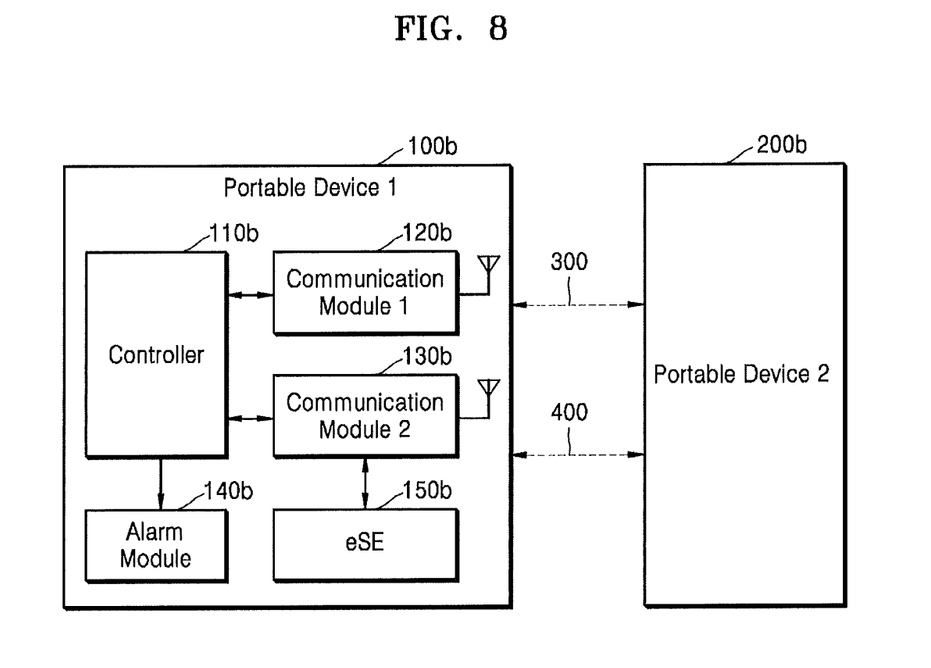
FIG. 8 is a block diagram illustrating an example of the first portable device of FIG. 1 according to an exemplary embodiment in accordance with principles of inventive concepts.

FIG. 8 is a block diagram illustrating a first portable device 100b, which is an example of the first portable device 100 of FIG. 1 according to an exemplary embodiment in accordance with principles of inventive concepts. Although FIG. 8 illustrates only a block diagram of the first portable device 100b, it may be understood that the second portable device 200b may also be configured in the same, or similar, manner as the first portable device 100b of FIG. 8.

Referring to FIG. 8, the first portable device 100b may include a controller 110b, a first communication module 120b, a second communication module 130b, an alerting module 140b, and an embedded secure element (eSE) 150b. The controller 110b, the first communication module 120b, and the alerting module 140b of FIG. 9 may be operated in the same or similar manner as the corresponding components in FIG. 1.

The eSE 150b may refer to a secure element (SE) built in a semiconductor chip. The secure element (SE) may refer to a region including component that safely stores and processes data, such as financial information, authentication information, or a service application that is required to be secured. For example, when the second communication module 130b is an NFC module supporting NFC, the eSE 150b may be built in an NFC chipset in which the NFC module is configured. The NFC module having an SE built-in may be used for payment, authentication and the like, because of its high security.

According to an exemplary embodiment in accordance with principles of inventive concepts, the second communication module 130b may transmit and receive a signal that is encrypted on the basis of data stored in the eSE 150b to and from the second portable device 200b. The encrypted signal may be decrypted by the eSE 150b, and the second portable device 200b may be identified on the basis of the decrypted signal. Accordingly, it is possible to prevent the first or second portable device 100b or 200b from improperly canceling an alarm by using specific information of each of the first and second portable devices 100b and 200b.

Figure 9:
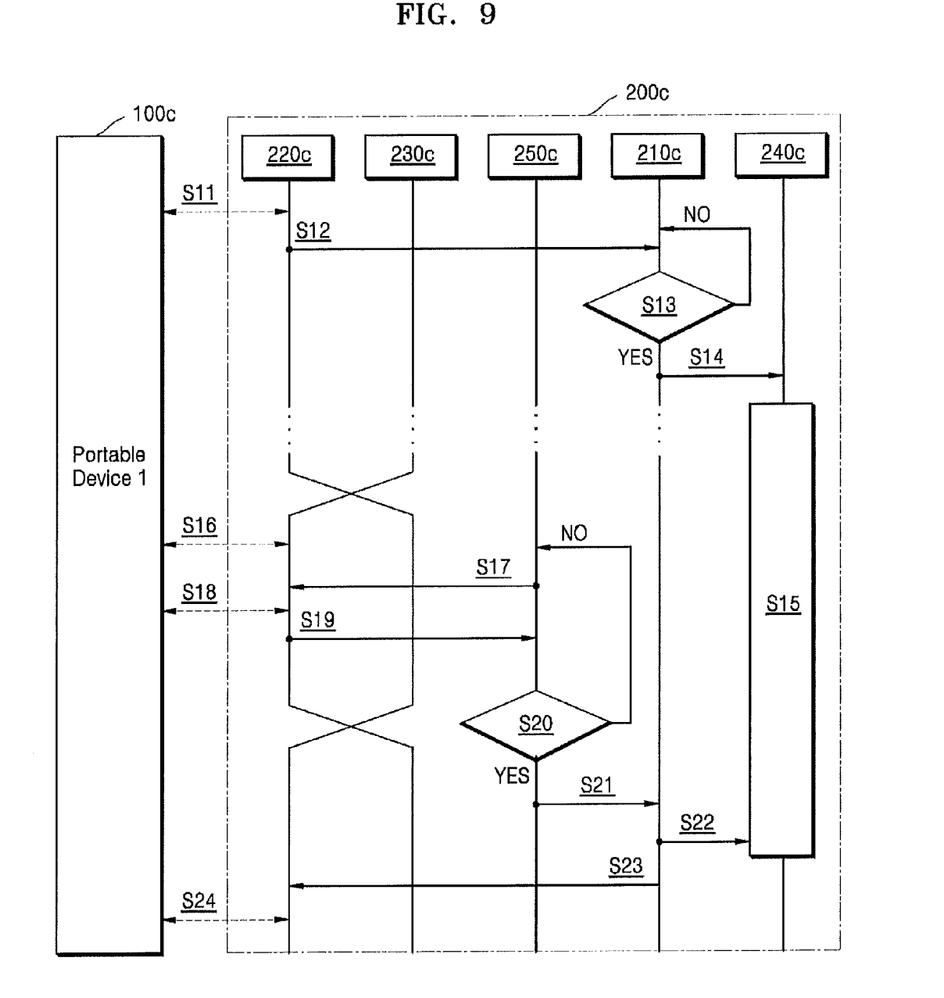
FIG. 9 is a diagram illustrating operations of issuing and canceling an alarm with time in first and second portable devices according to an exemplary embodiment in accordance with principles of inventive concepts.

FIG. 9 is a diagram illustrating operations of issuing and canceling an alarm, along a time line, in first and second portable devices 100c and 200c according to an exemplary embodiment in accordance with principles of inventive concepts. Although FIG. 9 illustrates operations performed inside the second portable device 200c, it may be understood that the first portable device 100c may also be operated in the same or similar manner as the second portable device 200c. Referring to FIG. 9, the second portable device 200c may include a controller 210c, a first communication module 220c, a second communication module 230c, an alerting module 240c, and an eSE 250c.

In step S11, the first communication module 220c may communicate with the first portable device 100c through the first wireless communication method 300. For example, the first communication module 220c may periodically perform transmission and reception of a signal, that is, transmit and receive a signal, through the first wireless communication method 300 to thereby maintain connection to the first portable device 100c.

In step S12, when an event occurs while the first communication module 220c communicates with the first portable device 100c, the first communication module 220c may transmit a signal to inform the controller 210c of the occurrence of the event. For example, when the intensity of a signal received in the first communication module 220c through the first wireless communication method 300 reaches a lower threshold, or a signal may not be transmitted, the first communication module 220c may transmit a signal for informing the controller 210c of the occurrence of the event.

In step S13, the controller 210c may determine a distance D between the first and second portable devices 100c and 200c and may determine whether the distance D is greater than a reference distance D_REF, based on the signal strength of received signal, for example. When the distance between the first and second portable devices 100c and 200c is greater than the reference distance, the controller 210c may transmit a signal to the alerting module 240c so as to cause the alerting module 240c to issue an alarm in step S14.

In step S15, the alerting module 240c may issue an alarm by generating a physical output. For example, the alerting module 240c may output a symbol or a wording through a display device, may output a sound through a speaker or a buzzer, may output light through a light-emitting element, or may generate vibration through a motor. In exemplary embodiments, the alerting module 240c may simultaneously perform a combination of at least two of the plurality of operations. The alerting module 240c may continuously issue an alarm until receiving a signal to cancel the alarm from the controller 210c.

In step S16, the second communication module 230c may attempt to communicate with the first portable device 100c through the second wireless communication method 400. For example, the second communication module 230c may transmit a signal through the second wireless communication method 400 in order to communicate with the first portable device 100c. When the first and second portable devices 100c and 200c come close to each other, at a distance equal to or less than a communicable distance of the second wireless communication method 400 (that is, within range of such method), the second communication module 230c may receive a signal from the first portable device 100c.

In step S17, the eSE 250c may transmit secured data to the second communication module 230c in order to identify the first portable device 100c and to make the first portable device 100c identify the second portable device 200c. In step S18, the second communication module 230c may communicate with the first portable device 100c in response to data received from the eSE 250c, and may attempt to identify the first portable device 100c. In step S19, the second communication module 230c may transmit data corresponding to a signal received from the first portable device 100c to the eSE 250c.

In step S20, the eSE 250c may identify the first portable device 100c on the basis of data received from the second communication module 230c. When the identification of the first portable device 100c succeeds, the eSE 250c may transmit a signal indicating that the identification of the first portable device 100c has succeeded to the controller 210c in step S21.

In step S22, the controller 210c may transmit a signal for canceling an alarm to the alerting module 240c in response to the signal received from the eSE 250c, and the alerting module 240c may stop the issuance of an alarm in response to the signal received from the controller 210c.

In step S23, the controller 210c may transmit a signal to the first communication module 220c so that the first communication module 220c starts to communicate with the first portable device 100c through the first wireless communication method 300, in order to determine the distance between the first and second portable devices 100c and 200c. In step S24, the first communication module 220c may transmit and receive a signal to and from the first portable device 100c through the first wireless communication method 300 in response to the signal received from the controller 210c.

Figure 10:
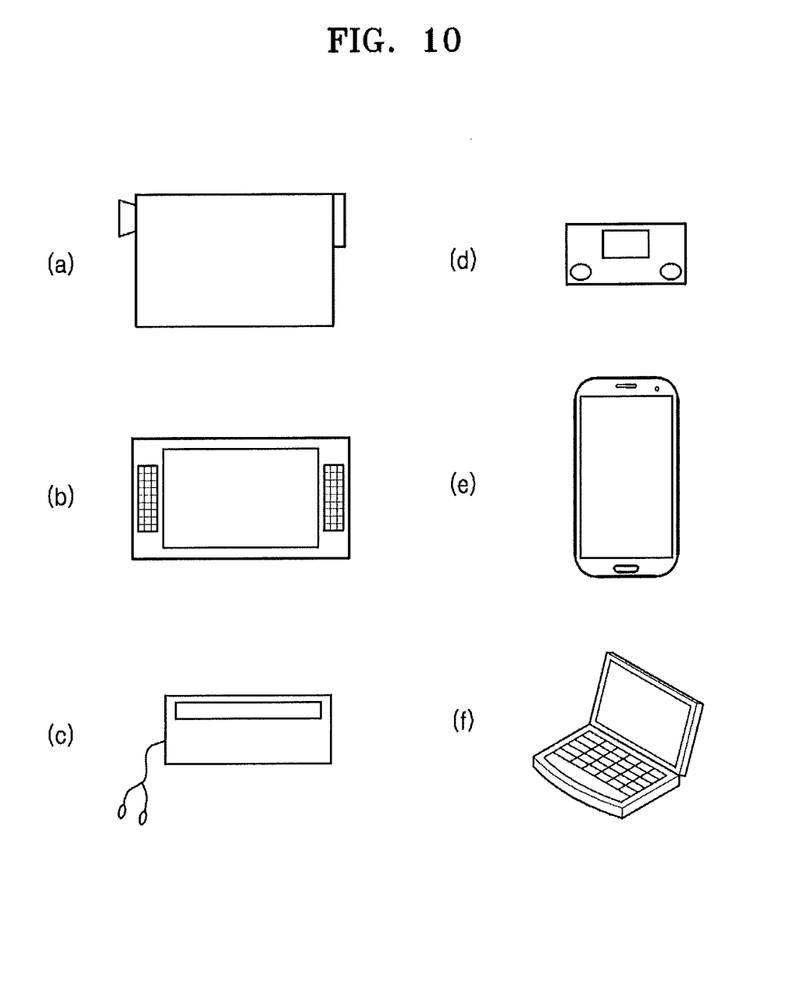
FIG. 10 is a diagram illustrating various portable electronic devices to which the alerting method according to an exemplary embodiment in accordance with principles of inventive concepts may be applied.

FIG. 10 is a diagram illustrating various portable electronic devices to which the alerting method according to an exemplary embodiment in accordance with principles of inventive concepts may be applied. The electronic devices illustrated in FIG. 10 are just examples, and inventive concepts are not limited thereto.

Referring to FIG. 10, when the above-mentioned first portable device (for example, the first portable device 100 of FIG. 1) is a wearable device (for example, a watch), a second portable device (for example, the second portable device 200 of FIG. 1) may be (a) a digital video camera, (b) a Portable multimedia player (PMP), (c) an audio apparatus, (d) a portable game console, (e) a smart phone, (f) a lap-top computer, or the like. When the second portable device is distant from the first portable device (and, thereby, from a user who is wearing the first portable device) by a distance greater than a reference distance, the first portable device may inform a user of the lost or stolen second portable device by issuing an alarm. The second portable device may also issue an alarm so that a user may easily find the second portable device.

The plurality of portable devices may communicate with each other to thereby perform the alerting method according to an exemplary embodiment in accordance with principles of inventive concepts. That is, the alerting method according to an exemplary embodiment in accordance with principles of inventive concepts may be applied also in a case where a user carries three or more portable devices. When a user wearing, for example, a first portable device as a wearable device, carries second and third portable devices, the first portable device and the third portable device may perform the alerting method by operating in the same manner as or in a similar manner to the first and second portable devices.

While the inventive concept has been particularly shown and described with reference to embodiments thereof, it will be understood that various changes in form and details may be made therein without departing from the spirit and scope of inventive concepts as expressed in the following claims.

What is claimed is:

1. An alerting method for a portable electronic device, the alerting method being performed by a second portable electronic device communicating with a first portable electronic device through first and second wireless communication methods different from each other and comprising:
   determining a distance between the first and second portable electronic devices through the first wireless communication method;
   issuing an alarm when the distance is greater than a reference distance;
   after issuing the alarm, the second portable electronic device attempting to identify the first portable electronic device through the second wireless communication method; and
   canceling the alarm when the second portable electronic device identifies the first portable electronic device.

2. The method of claim 1, wherein a communicable distance of the second wireless communication method is less than a communicable distance of the first wireless communication method.

3. The method of claim 2, wherein the second wireless communication method has a communicable distance of equal to or less than approximately 10 cm.

4. The method of claim 1, wherein the attempting to identify the first portable electronic device comprises transmitting and receiving an encrypted signal through the second wireless communication method.

5. The method of claim 1, wherein the issuing of the alarm comprises setting a security mode for blocking exposure of data stored in the second portable electronic device.

6. The method of claim 5, wherein the setting of the security mode comprises setting the security mode when the alarm is not canceled for a predetermined period of time or longer.

7. The method of claim 5, wherein the setting of the security mode comprises setting the security mode when the attempting to identify the first portable electronic device fails a predetermined number of times or more.

8. The method of claim 5, wherein the setting of the security mode comprises setting the security mode when power supplied to the second portable electronic device is blocked and is then supplied again.

9. The method of claim 5, wherein the second portable electronic device is configured to delete a portion of stored data or locks an external access to stored data during the security mode.

10. The method of claim 5, wherein the second portable electronic device is configured to block execution of an operation of processing a portion of stored data during the security mode.

11. The method of claim 1, wherein the first wireless communication method is Bluetooth®, and the second wireless communication method is Near Field Communication (NFC).

12. The method of claim 1, wherein the first portable electronic device is a wearable electronic device, and the second portable electronic device is a mobile phone.

13. An alerting method for a portable electronic device, the alerting method using first and second portable electronic devices communicating with each other through first and second wireless communication methods different from each other and comprising:

determining a distance between the first and second portable electronic devices through the first wireless communication method;

issuing an alarm by at least one of the first and second portable electronic devices when the distance is greater than a reference distance;

the first and second portable electronic devices attempting to identify each other through the second wireless communication method in response to the alarm; and canceling the alarm when the first and second portable electronic devices identify each other.

14. The method of claim 13, wherein a communicable distance of the second wireless communication method is less than a communicable distance of the first wireless communication method.

15. The method of claim 13, wherein the first wireless communication method is Bluetooth®, and the second wireless communication method is Near Field Communication (NFC).

16. A method in a plurality of electronic devices, comprising:

first and second electronic devices communicating with one another through two different wireless channels, a first channel providing longer range communications than a second channel;

the second electronic device entering an alarm mode of operation if communications through the first channel fail; and the second electronic device exiting the alarm mode of operation if communications through the second channel are restored, wherein the second electronic device identifies the first electronic device through the second channel before exiting the alarm mode of operation.

17. The method of claim 16, wherein the first and second electronic devices regularly communicate with one another through the first channel to ensure that any loss of communications through the second channel are detected within a threshold period of time.

18. The method of claim 16, wherein the first channel providing communications is Bluetooth®.

19. The method of claim 18, wherein the second channel providing communications is Near Field Communication (NFC).

* * * * *